(12) United States Patent
Kennedy

(10) Patent No.: US 10,917,503 B2
(45) Date of Patent: Feb. 9, 2021

(54) PACKET RECORDING

(71) Applicant: Metaswitch Networks Limited, Middlesex (GB)

(72) Inventor: Steven Kennedy, Middlesex (GB)

(73) Assignee: Metaswitch Networks Ltd, Enfield (GB)

( * ) Notice: Subject to any disclaimer, the term of this patent is extended or adjusted under 35 U.S.C. 154(b) by 0 days.

(21) Appl. No.: 14/833,860

(22) Filed: Aug. 24, 2015

(65) Prior Publication Data

US 2016/0065465 A1 Mar. 3, 2016

(30) Foreign Application Priority Data

Aug. 29, 2014 (GB) .................................... 1415358.9

(51) Int. Cl.
*H04L 29/06* (2006.01)
*H04L 12/833* (2013.01)

(52) U.S. Cl.
CPC .............. *H04L 69/22* (2013.01); *H04L 47/31* (2013.01)

(58) Field of Classification Search
None
See application file for complete search history.

(56) References Cited

U.S. PATENT DOCUMENTS

| | | | |
|---|---|---|---|
| 6,757,738 B1 * | 6/2004 | Cao | H04L 47/2441 370/312 |
| 8,165,114 B2 * | 4/2012 | Halbraich | H04L 12/66 370/389 |
| 2003/0043755 A1 | 3/2003 | Mitchell | |
| 2003/0108069 A1 * | 6/2003 | Yamada | H04J 3/1611 370/535 |
| 2006/0268847 A1 * | 11/2006 | Halbraich | H04L 12/66 370/352 |
| 2007/0297376 A1 * | 12/2007 | Gass | H04L 63/00 370/338 |
| 2008/0063167 A1 * | 3/2008 | Rao | H04M 3/42221 379/142.13 |
| 2008/0123628 A1 * | 5/2008 | Everard | H04L 65/1083 370/352 |
| 2008/0285485 A1 * | 11/2008 | Kingsley | H04L 65/1083 370/259 |
| 2009/0041207 A1 * | 2/2009 | Dilkie | H04M 3/42221 379/70 |
| 2009/0185673 A1 * | 7/2009 | Erhart | H04M 3/42221 379/265.09 |

(Continued)

*Primary Examiner* — Kodzovi Acolatse
(74) *Attorney, Agent, or Firm* — Stetina Brunda Garred and Brucker

(57) ABSTRACT

An apparatus and a method for processing a received data packet are provided. The method involves determining whether the received data packet is to be recorded and applying to the packet a virtual LAN identification tag from a first group of one or more predetermined virtual LAN identification tags if it is determined that the packet is to be recorded. A recording management system is also provided, including an apparatus and a forwarding network element. The forwarding network element is arranged to inspect as received data packet and determine a virtual LAN identification tag of the packet. The forwarding network element is further arranged to cops the data packet if the virtual LAN identification tag of the packet is in the first group and to send the copy of the data packet to a recording element.

15 Claims, 3 Drawing Sheets

(56) References Cited

U.S. PATENT DOCUMENTS

| | | | | |
|---|---|---|---|---|
| 2009/0268885 A1* | 10/2009 | Portman | ............ | H04M 3/42221 |
| | | | | 379/88.17 |
| 2010/0175122 A1* | 7/2010 | Ballard | ............... | H04L 63/1466 |
| | | | | 726/12 |
| 2011/0134925 A1* | 6/2011 | Safrai | ..................... | H04L 49/35 |
| | | | | 370/395.53 |
| 2011/0228778 A1* | 9/2011 | Dyke | ....................... | H04L 45/66 |
| | | | | 370/392 |
| 2011/0255540 A1* | 10/2011 | Mizrahi | .................. | H04L 45/00 |
| | | | | 370/392 |
| 2011/0299532 A1 | 12/2011 | Yu et al. | | |
| 2014/0075041 A1* | 3/2014 | Keesara | .................. | H04L 49/20 |
| | | | | 709/231 |
| 2014/0122704 A1* | 5/2014 | Wang | .................... | H04L 49/354 |
| | | | | 709/224 |
| 2015/0381430 A1* | 12/2015 | Deguchi | ............. | H04L 43/0876 |
| | | | | 709/224 |

\* cited by examiner

PACKET RECORDING

CROSS REFERENCE TO RELATED APPLICATIONS

The present application claims priority to UK Patent Application No. 1415358.9 filed Aug. 29, 2014, the entirety of the disclosure of which is expressly incorporated herein by reference.

STATEMENT RE: FEDERALLY SPONSORED RESEARCH/DEVELOPMENT

Not Applicable.

FIELD OF THE INVENTION

The invention relates to recording of data packets passing over a network and, in particular, to recording of voice data packets.

BACKGROUND OF THE INVENTION

Internet Protocol (IP) networks can carry various kinds of data packets. IP networks may carry voice data packets, for example, which enables voice data to be sent and received using an IP network. This allows services such as voice-over-Internet Protocol (VoIP) to be supplied.

IP networks that are configured to carry voice data packets often include a session border controller (SBC). An SBC is a network element which serves as a firewall for VoIP data packets entering a network or network segment. An SBC is typically located at a boundary of a network or network segment, so that all voice data packets entering or leaving the network or network segment are received by the SBC.

The SBC processes the voice data packets that it receives to determine the intended destination(s) of the packets. The SBC may also process the packets to determine whether they are safe for transmission to the destination(s). The SBC is therefore able to serve as a router and a filter for the voice data packets. The SBC may perform additional functions, including quality of service policing or statistic gathering, to collect information about the number, type and other parameters of packets entering the network.

The operator of a network may wish to store some of the data packets that enter or leave the network. For example, voice data packets might be stored to provide a recording of a voice call. The operator of the network may wish to do this if, for example, the operator is required to provide recordings of certain voice conversations to law enforcement personnel, or if recording some voice conversations would enable or improve training of staff working for the operator of the network (e.g., in a call centre). The operator of the network might wish to store recordings of voice conversations so that the recordings can be played for reference purposes.

Recording of conversations is often performed by a dedicated recording element in the network. Typically, such a recording element is configured to record all voice data packets it receives. The operator of the network therefore needs to arrange for data packets that are to be recorded to be sent to the recording element.

A conventional way to ensure that data packets to be recorded are sent to a recording element is to duplicate all packets, send the original packets to their intended destination(s), and send the duplicates to the recording element. However, in many circumstances, only some of the data packets need recording. Indiscriminately duplicating all data packets is therefore often unnecessary.

Duplicating all data packets also creates a large processing burden on the network element responsible for duplicating the packets (which may, depending on the network configuration, be the SBC). Furthermore, it creates a large storage burden on the dedicated recording element and a large transfer burden on the network between the network element responsible for duplicating the packets and the recording element. These burdens grow dramatically for networks comprising many network elements, in which many voice conversations may take place simultaneously.

Another conventional way to ensure that data packets are sent to a dedicated recording element is to initiate and maintain two (or more) call 'legs' for each voice conversation taking place in the network. This approach is used in the SIPREC protocol.

For example, an incoming SIP call from an external network is initiated and a call set-up message is received by an SBC. The SBC needs to establish a first 'leg' of the call, between the SBC and the intended destination of the voice conversation. The SBC and the destination exchange set-up data packets to initiate the first leg of the call.

The SBC also needs to establish a second 'leg' of the call, between the SBC and the dedicated recording element. The SBC and the recording element exchange set-up data packets to initiate the second leg of the call.

Once both legs of the call are established, the SBC must duplicate voice data packets received from the external network, to be sent to the destination and to the dedicated recording element. Similarly, voice data packets from the destination to the external network most also be duplicated by the SBC to be sent to the recording element. In this way, duplicate voice data packets corresponding to all of the voice data packets exchanged between the SBC and the intended destination are sent to the recording element for recording.

Duplicating data packets at the SBC creates a large processing burden on the SBC. Establishing and maintaining the multiple 'legs' of the call also places a large extra processing burden on the SBC. Moreover, the second leg of the call creates additional traffic on all of the network between the SBC and the recording element.

The present invention therefore aims to overcome or at least ameliorate at least some of the above-mentioned drawbacks.

SUMMARY OF THE INVENTION

Therefore, according to the present invention there is provided an apparatus for processing a received data packet, comprising: a processor for determining whether the received data packet is to be recorded, wherein the processor is configured to apply to the packet an identification tag from a first group of one or more predetermined identification tags, if it is determined that the packet is to be recorded.

This allows the processor (such as a SBC) to identify packets to be recorded without having to process and record the packets themselves or duplicate them and send them on to a separate recorder. Also, when the packet is forwarded on over the network, subsequent elements such as forwarding elements, are able to identify packets to be recorded and take suitable action such by duplicating them and sending them on to a recording device. The subsequent element only needs to be able to identify the identification tag and so little or no modification is needed to provide the ability to identify packets to be recorded. The packets do not need to be analysed or processed other than to read the identification tag, which is preferably included in the packet header to allow it to be easily read.

The processor is preferably configured to apply to the packet an identification tag from a second group of one or more predetermined identification tags, if it is determined that the packet is not to be recorded. By using tags for a first group (although the group may only include one tag) to identify packets to be recorded and a second group (which again may only include one tag) to identify packets not to be recorded, the incoming packets can be easily sorted and may even be treated differently as they are routed to aid filtering.

Preferably the processor determines whether the received data packet is to be recorded based on a property of the packet. The processor may use any number of rules or algorithms to determine whether the packet is to be recorded. These rules may look at the properties of the packets to assess them. For example, the rules may suggest that packets going to certain recipients or from certain senders, or even combinations of those, should be recorded. Other properties may be the time of sending, the type of packet and so on.

The property of the packet may comprise at least one of an address associated with a sender of the packet and an address associated with the recipient of the packet.

The data packet may be an IP packet comprising voice data of a voice conversation. The packets may contain other data, which may also be recorded, such as video or other kinds of sound data.

Preferably the identification tag is one of a virtual LAN identification tag; a MAC address, and an MPLS label. These tags can be easily read by the processor to determine their value and so determine if recording is required.

The present invention may also provide a method for processing a received data packet, comprising: determining whether the received data packet is to be recorded; and applying to the packet an identification tag from a first group of one or more predetermined identification tags, if it is determined that the packet is to be recorded.

Preferably, an identification tag is applying to the packet from a second group of one or more predetermined identification tags, if it is determined that the packet is not to be recorded.

The determining as to whether the received data packet is to be recorded may comprise checking a property of the packet.

The checking of a property of the packet may comprise checking at least one of an address associated with a sender of the packet and an address associated with a recipient of the packet.

The data packet may be an IP packet comprising voice data of a voice conversation.

The identification tag may be one of: a virtual LAN identification tag; a MAC address, and an MPLS label.

The present invention may further comprise a recording management system, comprising: an apparatus as described above along with a forwarding network element, wherein said forwarding network element is arranged to inspect a received data packet and determine the identification tag of the data packet, and said forwarding network element is further arranged to copy the data packet if the identification tag of the packet is in said first group and to send said copy of the data packet to a recording element.

The combination of the forwarding element and processor allows packets to be identified and tagged by the processor before being forwarded on. The forwarding element, which might be located further alone the route of the packet, receives the packets and can quickly identify if they are to be recorded before forwarding them on towards their final destination, as well as duplicating and sending them on to a recording device, if required.

The present invention may also comprise a received data packet processing program, executable in a processor (e.g. microprocessor, as opposed to the processor mentioned above) and which when executed, causes the processor to operate so as to determine whether the received data packet is to be recorded; and applying to the packet an identification tag from a first group of one or more predetermined identification tags, if it is determined that the packet is to be recorded.

The present invention may further provide a computer readable medium carrying a data packet processing program, executable in a processor and which when executed, causes the processor to operate so as to determine whether a received data packet is to be recorded; and applying to the packet an identification tag from a first group of one or more predetermined identification tags, if it is determined that the packet is to be recorded.

BRIEF DESCRIPTION OF THE DRAWINGS

A specific embodiment of the invention will now be described by way of non-limiting example, in which.

DETAILED DESCRIPTION

Figure 1:
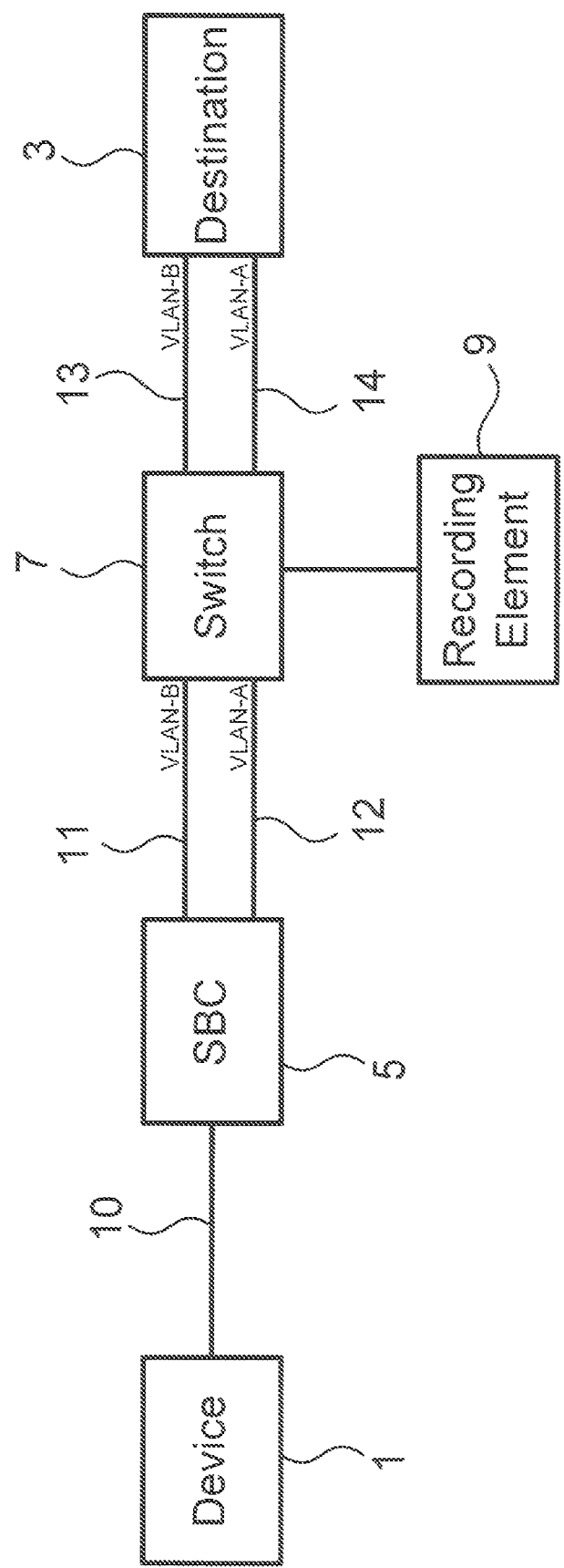
FIG. 1 shows a schematic illustration of a network.

FIG. 1 shows schematically an embodiment of the invention. In this example, SBC 5 receives 10 a voice data packet from a device 1 outside the SBC's network or network segment. A processor in the SBC 5 processes the received data packet to determine an intended Destination 3 of the packet in the network or network segment, and to determine whether or not the packet needs to be sent to a dedicated recording element 9 in the network for recording.

If the SBC 5 determines that the data packet does need to be sent to the recording element 9 for recording, the SBC 5 applies to the packet a first VLAN ID tag (e.g. 'VLAN-A') identifying a VLAN 12 from a first group of one or more predetermined VLANs. The SBC 5 then sends the packet out onto the network or network segment. The VLANs in the first group are used to indicate that recording is required.

If the SBC 5 determines that the data packet does not need to be sent to the recording element 9 for recording, the SBC 5 applies to the packet a second VLAN ID tag (e.g. 'VLAN-B') identifying a VLAN 11 from a second group of one or more predetermined VLANs. The SBC 5 then sends the packet out onto the network or network segment. The VLANs in the second group are used to indicate that recording is not required.

Figure 2:
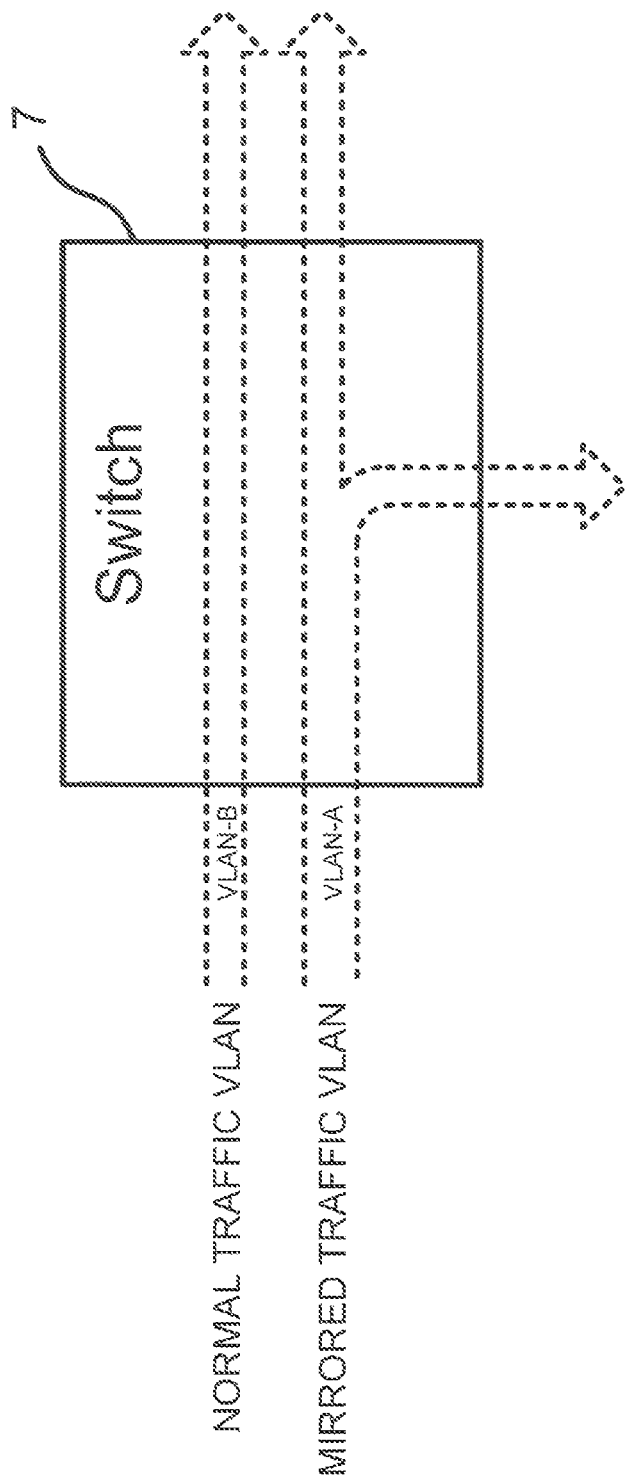
FIG. 2 shows schematically the operation of the switch.

The packet is received over the network by a forwarding network element 7, in this case a switch, which inspects the VLAN ID tag of the packet. As shown schematically in FIG. 2, if the forwarding network element 7 determines that the VLAN ID tag of the packet it receives is a VLAN ID tag (e.g. 'VLAN-B') used to indicate that recording is not required (i.e. the VLAN belongs to the second group), the forwarding network element 7 forwards the packet on towards the Destination 3, again on VLAN-B 13. If the forwarding network element 7 determines that the VLAN ID tag of the packet it receives is a VLAN ID tag (e.g.

'VLAN-A') used to indicate that recording is required (i.e. that VLAN belongs to the first group), the forwarding network element 7 duplicates the packet, forwards one copy of the packet on towards the Destination 3 and forwards the other copy of the packet on towards the recording element 9, again on VLAN-A 14.

The VLANs in the first group of one or more predetermined VLANs are therefore 'mirrored' versions of those in the second group of one or more predetermined VLANs. All packets arriving at the forwarding network element 7 with a VLAN ID tag (e.g. 'VLAN-A') identifying a VLAN from the first group are duplicated by the forwarding network element 7, and the duplicates are forwarded on towards the recording element 9. Packets arriving at the forwarding network element 7 will be forwarded on towards their intended destination(s) by the forwarding network element 7, irrespective of VLAN.

Destination 3 receives the packet and processes the packet to extract voice conversation data in the normal way. Destination 3 does not require any modification due to the recording step. This enables Destination 3 to initiate, maintain or terminate a voice conversation as normal.

The recording element 9 receives the duplicate of the packet and processes the packet to record it.

As part of the ongoing call, Destination 3 creates packets to be sent to the device 1. As part of the call set up, the Destination 3 is informed by the SBC 5 of the source IP address on the respective VLAN to which messages are to be sent by the Destination 3. In this way, when the Destination 3 sends packets destined for Device 1 to the SBC 5, it does so on the correct IP address and with a VLAN ID tag corresponding to the VLAN ID tag of the packet that was received at the Destination 3, reflecting whether the message is being recorded.

Destination 3 sends the packets over the network via the appropriate VLAN to forwarding network element 7. The forwarding network element 7 receives a packet from Destination 3 and inspects the VLAN ID tag of the packet. If the forwarding network element 7 determines that the VLAN ID tag of the packet is used to indicate that recording is not required (i.e. that VLAN belongs to the second group), the forwarding network element 7 forwards the packet on towards the SBC 5, based on the source IP address on the appropriate VLAN. If the forwarding network element 7 determines that the VLAN ID tag of the packet is used to indicate that recording is required (i.e. that VLAN belongs to the first group), the forwarding network element 7 duplicates the packet and sends a copy of the packet to the SBC 5 and a copy of the packet to the recording element 9, for recording.

The recording element 9 receives the copy of the packet and processes the packet to record it.

The SBC 5 receives the packet and processes it to determine where the packet needs to be sent, as normal.

An example call is described below. Device 1 in an external network sends a data packet containing a call set-up message out onto the external network, for Destination 3 in a local network.

The packet is received by SBC 5 at a boundary of the local network. SBC 5 processes the call set-up message and determines an IP address of the device 1. SBC 5 checks the IP address of device 1 against a look-up table stored at the SBC 5 and determines, based on the check of the IP address, that the call needs to be recorded. SBC 5 applies VLAN ID tag 'VLAN-A' to the packet and forwards the packet over the local network towards Destination 3, including the SBC source IP address on that VLAN. Subsequent packets in the call are similarly tagged with the 'VLAN-A' tag, until it is determined that recording should stop.

The packet is received by switch 7, which inspects the packet and determines the VLAN ID tag of the packet. Switch 7 cheeks the VLAN ID tag of the packet against another look-up table and determines that the VLAN ID tag of the packet belongs to a group of VLAN ID tags used to indicate that recording is required. The switch 7 therefore duplicates the packet, and forwards one copy over the network 14 towards Destination 3 and another copy over the network towards recording element 9.

Recording element 9 receives the packet and processes the packet to record it. Destination 3 receives the packet and processes the packet. Destination 3 will send packets back carrying other parts of the conversation. Destination 3 creates a new packet comprising, for example, a call set-up confirmation message and having VLAN ID tag 'VLAN-A' applied to it. The new packet is forwarded over the network towards device 1 in the external network to go via the SBC 5 based on the appropriate source IP address provided by the SBC 5.

The new packet is received by switch 7, which inspects the packet and determines, from the 'VLAN-A' VLAN ID tag, that the new packet needs to be duplicated and forwarded to recording element 9 for recording as well as being forwarded to device 1. Switch 7 therefore duplicates the new packet and forwards one copy of the packet towards recording element 9 and another copy towards device 1 on VLAN-A 12.

Recording element 9 receives one copy of the packet and records it.

SBC 5 receives another copy of the packet and processes it. SBC 5 forwards the packet out of the local network towards device 1. Device 1 receives the packet. Device 1 and Destination 3 continue to exchange packets until a packet or packets comprising a call termination message is or are exchanged between the device 1 and the Destination 3. All packets of the call are duplicated at switch 7, and copies are sent to recording element 9 for recording. Recording element 9 therefore records a complete copy of the call. The recorded copy can be accessed and played at a later time via an interface of recording element 9.

A voice conversation taking place over a network can thus be recorded in a way which requires less processing at the SBC and creates less network burden than conventional recording methods. Applying a VLAN ID tag places significantly less burden on the SBC processor than, for example, initiating and maintaining multiple call legs. Furthermore, only one packet is sent from the SBC to the forwarding network element 7. This results in a lower network burden, since any packets to be duplicated are only duplicated at the switch, which is closer to the destination and the recorder.

Figure 3:
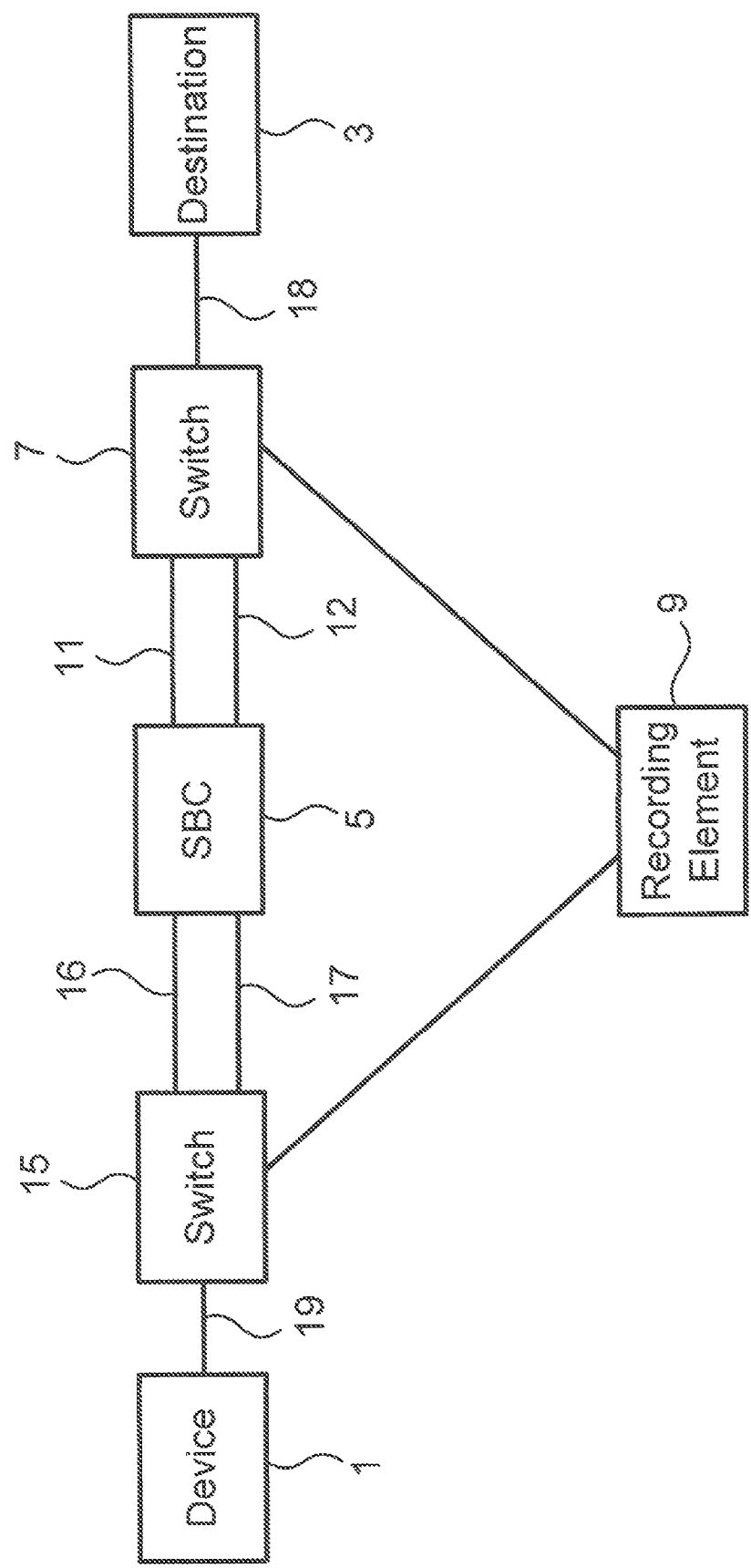
FIG. 3 shows an alternative embodiment.

FIG. 3 shows schematically an alternative embodiment of the invention. In this example, another forwarding network element 15 (switch in this example) is provided on the other side of the SBC 5 to switch 7, between the SBC and the Device 1. This provides a symmetrical sort of structure whereby traffic passing through the SBC can be identified for recording and the packets captured by the switches 5, 7 on either side.

In this arrangement, a packet is sent from Device 1 to SBC 5 for setting up a call to Destination 3. The packet passes through Switch 15 which forwards it on to SBC 5. SBC 5 processes the received data packet to determine an intended Destination 3 of the packet in the network or network segment, and to determine whether or not the packet needs to be recorded, in a similar manner to that described above.

If the SBC 5 determines that the data packet does need to be sent to the recording element 9 for recording, the SBC 5 applies to the packet a first VLAN ID tag (e.g. 'VLAN-A') identifying a VLAN 12. The SBC 5 then sends the packet out onto the network or network segment.

If the SBC 5 determines that the data packet does not need to be sent to the recording element 9 for recording, the SBC 5 applies to the packet a second VLAN ID tag e.g. 'VLAN-B') identifying a VLAN 11, as explained above.

Again, the packet is received over the network by a forwarding network element 7 which inspects the VLAN ID tag of the packet. If the forwarding network element 7 determines that the VLAN ID tag of the packet it receives indicates that recording is not required, the forwarding network element 7 forwards the packet on towards the Destination 3. This may be over the respective VLAN, as in the embodiment above, or it may be over a link 18 which does not distinguish between packets to be recorded or not.

If the forwarding network element 7 determines that the VLAN ID tag of the packet it receives is a VLAN ID tag (e.g. 'VLAN-A') used to indicate that recording is required, the forwarding network element 7 duplicates the packet, forwards one copy of the packet on towards the Destination 3 and forwards the other copy of the packet on towards the recording element 9 over link 18.

As before, Destination 3 does not require any modification due to the recording step. This enables Destination 3 to initiate, maintain or terminate a voice conversation as normal.

As part of the ongoing call, Destination 3 creates packets to be sent to the device 1. As part of the normal call set up, the Destination 3 is informed by the SBC 5 of the source IP address to which messages are to be sent by the Destination 3. In this way, Destination 3 sends packets destined for Device 1 to the SBC 5. The packet is sent over link 18 but does not include the VLAN tag to indicate whether the packet is to be recorded. Switch 7 therefore forwards the packet on towards the destination indicated by the source IP provided by Destination 3.

The packet is received by the SBC 5, which analyses the packet in the same way that the packets from Device 1 are considered and the SBC determines if the packet is one to be recorded. According to this determination, the SBC allocates the packet to a corresponding VLAN (e.g. VLAN-A, or VLAN-B). The packet is then sent on to switch 15 over the appropriate VLAN 16, 17. Switch 15 receives the packet and considers the packets in a similar manner to Switch 7 to determine if the packet is received on a VLAN (with the corresponding VLAN tag) which represents the need to record the packet, or not.

If the switch 15 determines that the packet is to be recorded, it duplicates it and sends one version on towards the final destination, Device 1, and a copy to Recording element 9. Again, the packet may be sent on to Device 1 over a link 19 without the need to use VLANs.

In this way, whichever way a packets enters the system shown in FIG. 3, it passes through the SBC, which identifies whether it is to be recorded. It then passes the message on over a suitable VLAN, to a switch (either 7 or 15 depending on the direction). The respective switch can then use the VLAN of the message to determine whether to record the packet or not. This means that whether packets originate from Destination 3 or Device 1, the packets will be assessed by the SBC and recorded if appropriate.

The Recording element 9 is shown as a single entity in FIG. 3 but it may be provided by two separate devices, particularly if the switches 7 and 15 are geographically separated. The recorded data would reflect two halves of the conversation and the halves would need to be reconciled and collated to reconstruct the complete conversation. However, this may be done at a later date, for example, by sending one part or the conversation to the device holding the other or by collating the halves at a third location.

Where a single Recording element 9 is used, the switch 15 may, for example, simply route the packets to be recorded over a link to Recording Element 9. The link may be a dedicated link or routed over the same network on which die packets are routed.

Although the above has been described in terms of voice data packets, other embodiments may involve data packets of other types, such as video data packets, text data packets and other varieties of data packet.

In the embodiments described above, a VLAN ID tag (e.g. 'VLAN-B') is applied to a data packet when it is determined that the data packet does not need to be recorded. However, in other embodiments, the packet may instead have no VLAN ID tag applied to it if it does not need to be recorded. Therefore, in those embodiments, packets having a VLAN ID tag (e.g. 'VLAN-A') are duplicated and forwarded towards a recording element for recording as well as being forwarded towards a destination, while packets without a VLAN ID tag are not duplicated and are forwarded only towards the destination. Conversely, in other embodiments, the absence of a VLAN ID tag may indicate that recording of that packet is required, while the presence of a VLAN ID tag may indicate that recording is not required.

As noted above, VLANs may be selected from groups of VLANs. In the example above, 'VLAN-A' and 'VLAN-B' are each selected from one of two groups of VLANs. 'VLAN-B' may belong to a group of several VLAN ID tags which are used to indicate that recording is not required. Similarly, 'VLAN-A' may belong to a group of several VLAN ID tags which are used to indicate that recording is required. The different VLANs within each group may be used for a variety of purposes, such as to separate different types of network traffic.

In some embodiments, there may be a corresponding 'mirrored' VLAN in the first group of VLAN ID tags for each 'normal' VLAN in the second group of VLAN ID tags where recording may be required. For example, 'VLAN-A' may correspond to 'VLAN-B', 'VLAN-C' may correspond to 'VLAN-D', and 'VLAN-E' may correspond to 'VLAN-F'. The forwarding network element(s) in the network may store lists of the groups of different VLAN ID tags, so that the forwarding network element does not duplicate packets with VLAN ID tags 'VLAN-B', 'VLAN-D' or 'VLAN-F', but does duplicate packets with VLAN ID tags 'VLAN-A', 'VLAN-C' and 'VLAN-E' for forwarding to a recording element.

Of course, the groups may be limited to a single VLAN each such that only two VLANs are used, e.g. VLAN-A and VLAN-B.

Whether a voice data packet should be recorded is determined based on routing rules. The routing rules may be based on any property of the incoming message, such as IP address of the sender, a REGEX match on a substring of the incoming message, and so on. The SBC 5 may compare SIP level information to define the subscriber, such as Public AOR (Address of record) which is a URI. For SIP signalling packets, each packet may be identified by a Call Id in the header, which may be used to identify packets to be recorded.

When a message arrives, the SBC checks a property of the packet. In the example described above, the SBC determines the IP address of device 1 (the source of the packet) and checks the IP address against a look-up table to determine whether packets from that IP address should be recorded.

The SBC may search the data packet for a particular flag or regular expression to determine whether the packet should be recorded, or may check any of a number of other properties associated with the data packet. The packet may, for example, comprise a call set-up message according to a VoIP protocol. The SBC may check the contents of the call set-up message to determine whether or not the packet should be recorded and therefore whether a 'mirrored' VLAN ID tag or a 'normal' VLAN ID tag (or no VLAN ID tag) should be applied to the packet. In some embodiments, the packet may comprise a 'record' flag, set by a creator, sender or forwarder of the packet, for example. Reading the 'record' flag enables the SBC to determine whether the packet needs to be recorded. In other embodiments, the SBC may need to search the packet for other content and check the content against a look-up table to determine whether the packet needs to be recorded.

Other network elements may exist on links 11 and 12 between the SBC and the forwarding network element. These may include other forwarding network elements, such as one or more hubs, switches or routers, and may include other types of network element, such as servers or clients. Other network elements may exist on other links, such as on links 13, 14 and 17 between forwarding network element 7 and Destination 3, or on the link between the forwarding network element 7 and the recording element 9.

In the detailed embodiments described above, a call is initiated by device 1 in an external network. However, a call may instead be initiated by Destination 3 in the local network. In such cases, a packet comprising a call set-up message is forwarded over the local network by Destination 3 and received by SBC 5.

SBC 5 processes the packet and determines whether the call is to be recorded. SBC 5 may, for example, check the IP address of the intended recipient (e.g. device 1 in the external network) against a look-up table. The SBC 5 may alternatively be configured to record all calls initiated within the local network, or may fellow another rule for determining whether a call is to be recorded.

In the arrangement of FIG. 3, the SBC 5 then forwards the packet on to switch 15, which then duplicates the packet for forwarding towards the recording element 9 and the Device 1. The SBC 5 may then receive a new packet from device 1, to which SBC 5 applies an appropriate VLAN ID tag so that switch 7 will duplicate the packet for forwarding towards the recording element 9 and the Destination 3. All further packets of the call are duplicated by the switch 7 or 15, depending on direction, in accordance with the earlier description.

Device 1 and Destination 3 may be any of: a telephone, a personal computer, a laptop, a tablet, a PDA, a mobile phone, a server, or another network-connectable device configured to process data packets.

The recording element may be relatively simple in that it simply records all packets it receives without analysing the packets in detail. It may be a computer executing packet analysis software (e.g. tcpdump). The recording element may offer various different way to access and play recorded packets. It may be equipped with bespoke recording software with advanced organisation facilities and a graphical user interface, or may provide alternative means for accessing and manipulating the recorded packets.

In the examples above, the SBC 5 effectively tags packets to be recorded by applying a respective VLAN tag and sending it over the respective VLAN. However, other methods of tagging the packets may be used whilst still sending the packets over one LAN. Ideally, such tags would make use of existing data carried in standard packets which may be redundant in some cases.

A MAC address may be included in the packet which acts as a tag rather than identifying a real MAC address. By applying specific MAC addresses, the packets can be easily analysed to identify packets to be recorded and those which are not to be recorded. Again, as above, groups of tags may be used, potentially in pairs. For example, a packet may be provided with MAC address X to indicate packets are to be recorded and MAC address Y when they are not to be recorded. The MAC addresses may be unmodified where packets are not to be recorded and only modified to a specific one or set of MAC addresses when recording or required (or vice versa).

Depending on the network topology and protocols used, various different tags may be used to identify packets to be recorded without adding to the processing burden in the SBC and switches. MPLS (Multiprotocol Label Switching) labels may provide another way of tagging packets to be recorded.

In the examples above, the analysis of the packets is carried by the SBC 5. The element 5 does not necessarily need to be an SBC and could be any suitable network element through which the packets pass. Such an element may be arranged to operate independently, with an SBC, or, as in the examples above, form part of the SBC function.

What is claimed is:

1. A recording management system, comprising:
apparatus for processing and forwarding a received data packet; and a forwarding network element, separate from and connected to said apparatus over a network, the apparatus for processing and forwarding a received data packet comprising:
a network interface controller for receiving and forwarding a data packet over a network; and
a processor, wherein the processor is configured to determine whether the received data packet is to be recorded and to apply to the packet a virtual LAN (VLAN) identification tag from a first group of one or more predetermined VLAN identification tags, in response to it is determined that the packet is to be recorded, and wherein the network interface controller is configured to forward only one instance of the packet, with the VLAN identification tag, and wherein the forwarding network element is arranged
to inspect a received data packet and determine the VLAN identification tag of the data packet, and
to copy the data packet in response to the VLAN identification tag of the packet is in said first group and to send said copy of the data packet to a recording element.

2. A system as claimed in claim 1, wherein the processor is configured to apply to the packet a VLAN identification tag from a second group of one or more predetermined VLAN identification tags, if it is determined that the packet is not to be recorded.

3. A system as claimed in claim 2, wherein said processor determines whether the received data packet is to be recorded based on a property of the packet.

4. A system as claimed in claim 3, wherein said property of the packet comprises at least one of an address associated with a sender of the packet and an address associated with the recipient of the packet.

5. A system as claimed in claim 1, wherein said processor determines whether the received data packet is to be recorded based on a property of the packet.

6. A system as claimed in claim 5, wherein said property of the packet comprises at least one of an address associated with a sender of the packet and an address associated with the recipient of the packet.

7. A system as claimed in claim 1, wherein the data packet is an IP packet comprising voice data of a voice conversation.

8. A method for recording management of a received data packet, comprising:
   receiving a data packet over a network at a first network element;
   determining at said first network element whether the received data packet is to be recorded;
   at said first network element, applying to the packet a virtual LAN (VLAN) identification tag from a first group of one or more predetermined VLAN identification tags, in response to it is determined that the packet is to be recorded;
   forwarding only one instance of the packet with the VLAN identification tag over a network, from said first network element to a separate forwarding network element;
   inspecting the data packet received at the forwarding network element to determine the VLAN identification tag of the data packet; and
   copying the data packet in response to the VLAN identification tag of the packet is in said first group, and sending a copy of the data packet to a recording element.

9. A method as claimed in claim 8, comprising applying to the packet a VLAN identification tag from a second group of one or more predetermined VLAN identification tags, if it is determined that the packet is not to be recorded.

10. A method as claimed in claim 9, wherein said determining whether the received data packet is to be recorded comprises checking a property of the packet.

11. A method as claimed in claim 10, wherein said checking a property of the packet comprises checking at least one of an address associated with a sender of the packet and an address associated with a recipient of the packet.

12. A method as claimed in claim 8, wherein said determining whether the received data packet is to be recorded comprises checking a property of the packet.

13. A method as claimed in claim 12, wherein said checking a property of the packet comprises checking at least one of an address associated with a sender of the packet and an address associated with a recipient of the packet.

14. A method as claimed in claim 8, wherein the data packet is an IP packet comprising voice data of a voice conversation.

15. A non-transitory computer-readable medium carrying:
   a received data packet processing program, executable in a processor and which when executed on a first network element, causes the processor to perform operations comprising:
   determining whether the received data packet is to be recorded; applying to the packet a virtual LAN (VLAN) identification tag from a first group of one or more predetermined VLAN identification tags, in response to it is determined that the packet is to be recorded; and
   causing only one instance of the packet to be forwarded, with the VLAN identification tag over a network to a separate forwarding network element; and a forwarding network element program, executable in a processor and which when executed on said forwarding network element, causes the processor to perform operations comprising:
   inspecting the data packet received at the forwarding network element to determine the VLAN identification tag of the data packet; and
   copying the data packet in response to the VLAN identification tag of the packet is in said first group, and sending a copy of the data packet to a recording element.

\* \* \* \* \*